United States Patent
Guruprasad et al.

(10) Patent No.: US 11,809,609 B2
(45) Date of Patent: Nov. 7, 2023

(54) MALICIOUS ATTACK DETECTION TECHNIQUES

(71) Applicant: Arm Limited, Cambridge (GB)

(72) Inventors: Shashank Guruprasad, Bangalore (IN); Roma Rudra, Bangalore (IN); Abhishek Tripathi, Bangalore (IN)

(73) Assignee: Arm Limited, Cambridge (GB)

( * ) Notice: Subject to any disclaimer, the term of this patent is extended or adjusted under 35 U.S.C. 154(b) by 119 days.

(21) Appl. No.: 17/466,363

(22) Filed: Sep. 3, 2021

(65) Prior Publication Data

US 2023/0074623 A1   Mar. 9, 2023

(51) Int. Cl.
  *G06F 21/75* (2013.01)
  *G06F 21/57* (2013.01)

(52) U.S. Cl.
  CPC .......... *G06F 21/755* (2017.08); *G06F 21/57* (2013.01)

(58) Field of Classification Search
  CPC .............................. G06F 21/755; G06F 21/57
  See application file for complete search history.

(56) References Cited

U.S. PATENT DOCUMENTS

| | | | |
|---|---|---|---|
| 7,590,880 B1 * | 9/2009 | Hershman | G06F 21/755 713/400 |
| 11,018,657 B1 * | 5/2021 | Sinha | H03K 5/133 |
| 2007/0018003 A1 * | 1/2007 | Jeong | G06K 19/073 235/492 |
| 2010/0127767 A1 * | 5/2010 | Kim | G06F 21/77 327/551 |
| 2017/0032125 A1 * | 2/2017 | Lee | G08B 21/18 |
| 2019/0005269 A1 * | 1/2019 | Regner | H03K 19/17768 |

\* cited by examiner

*Primary Examiner* — Baotran N To
(74) *Attorney, Agent, or Firm* — Pramudji Law Group PLLC; Ari Pramudji (57) ABSTRACT

Various implementations described herein are directed to a device with a reset tree having leaf buffers that provide sensed output signals based on a reset-synchronizing input signal. The device may have a first sensor that receives the sensed output signals from the leaf buffers of the reset tree and provides an attack detection signal based on sensing a malicious attack. The device may have a second sensor that receives the reset-synchronizing input signal, receives the attack detection signal from the first sensor and provides a reset alarm signal based on duration of a timing glitch associated with comparing a difference between the reset-synchronizing input signal and the attack detection signal.

20 Claims, 6 Drawing Sheets

MALICIOUS ATTACK DETECTION TECHNIQUES

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In conventional circuit designs, laser attacks on various parts of a circuit are a way of inducing faults in specific modules of a design. For instance, in some scenarios, attackers can likely disable security mechanisms by resetting specific parts of a design. Some detector circuits can detect attacks on various parts of circuit to raise an alarm that can be processed to start a preventive action, such as shutting down and/or resetting entire circuits. The attack detector circuit can be implemented with scripts during the implementation flow of the design and needs no or minimum hooks in register transfer logic (RTL). In some cases, the values of reset signals in the design can be compared to the reset value at a root signal generator, wherein an alarm can be generated if the reset values are different from the root value. This attack detector circuit can be designed with various reset configurations, which can be typical for some conventional circuit designs. Unfortunately, conventional attack detection circuits are area inefficient and performance deficient, which increases costs associated with any attempt to implement malicious attack detection. Thus, there exists a need to improve the efficiency of attack detector designs that enhances area and performance in modern circuitry.

BRIEF DESCRIPTION OF THE DRAWINGS

Implementations of various memory layout schemes and techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to attack detector architecture with malicious attack detection schemes and techniques for supporting fault detector applications in reference to physical circuit designs. Also, various implementations described herein may provide a reset tree attack detector circuitry that is configured to detect fault inducing attacks on any asynchronous reset branch of a physical circuit design, wherein a reset alarm signal may be generated if a malicious attack is detected on a reset tree. Various malicious attack detection schemes and techniques described herein may be configured to use various logic, such as, e.g., various logic gates and one or more registers that are arranged and configured to detect a malicious attack such that any impact on power, performance and area (PPA) is reduced, or at least lower to a minimum in physical circuit designs.

Various implementations of providing various attack detector architecture with an error-bit generator will be described herein with reference to FIGS. 1A-4.

Figure 1A:
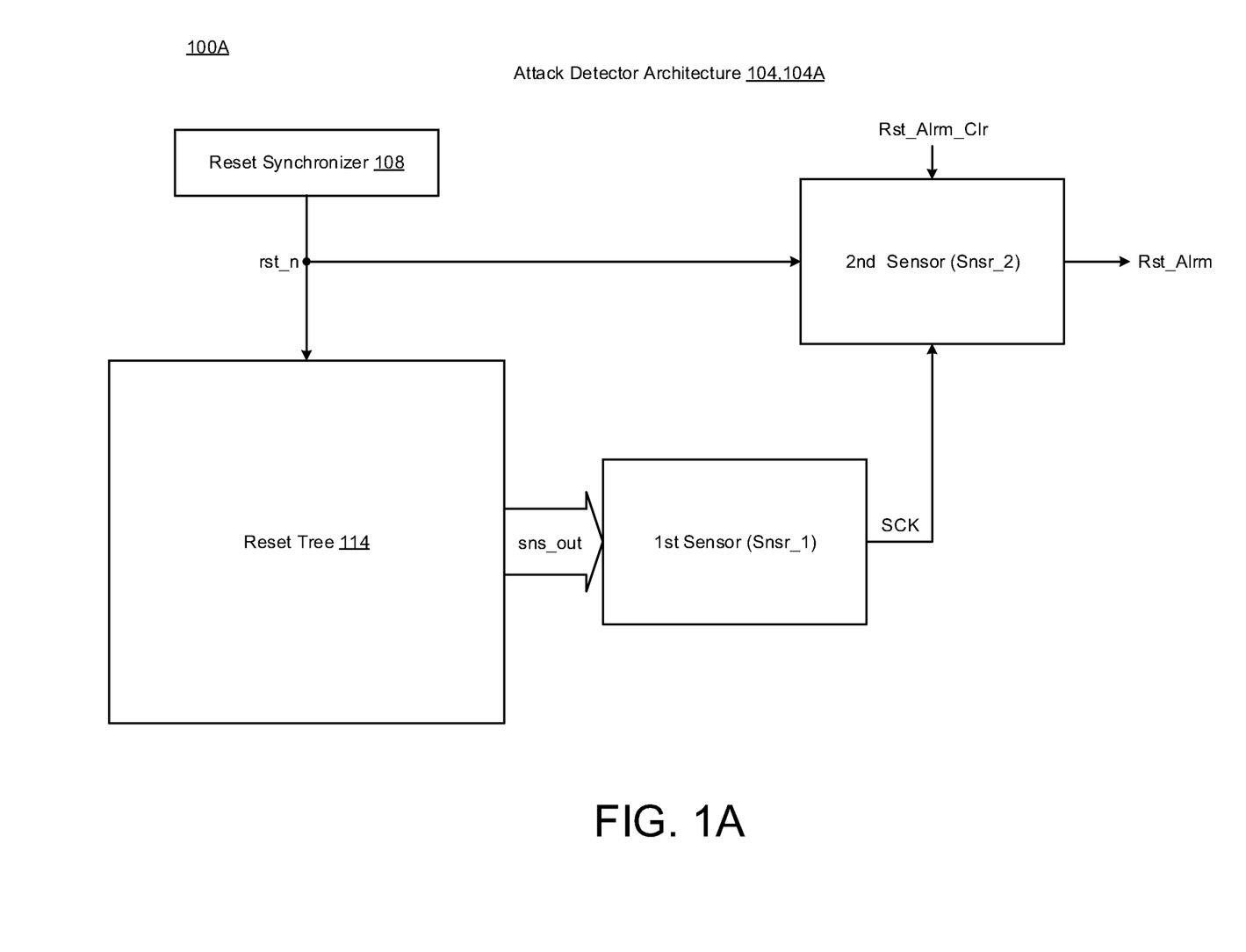
FIGS. 1A-1B illustrate diagrams of attack detector architecture in accordance with various implementations described herein.
Figure 1B:
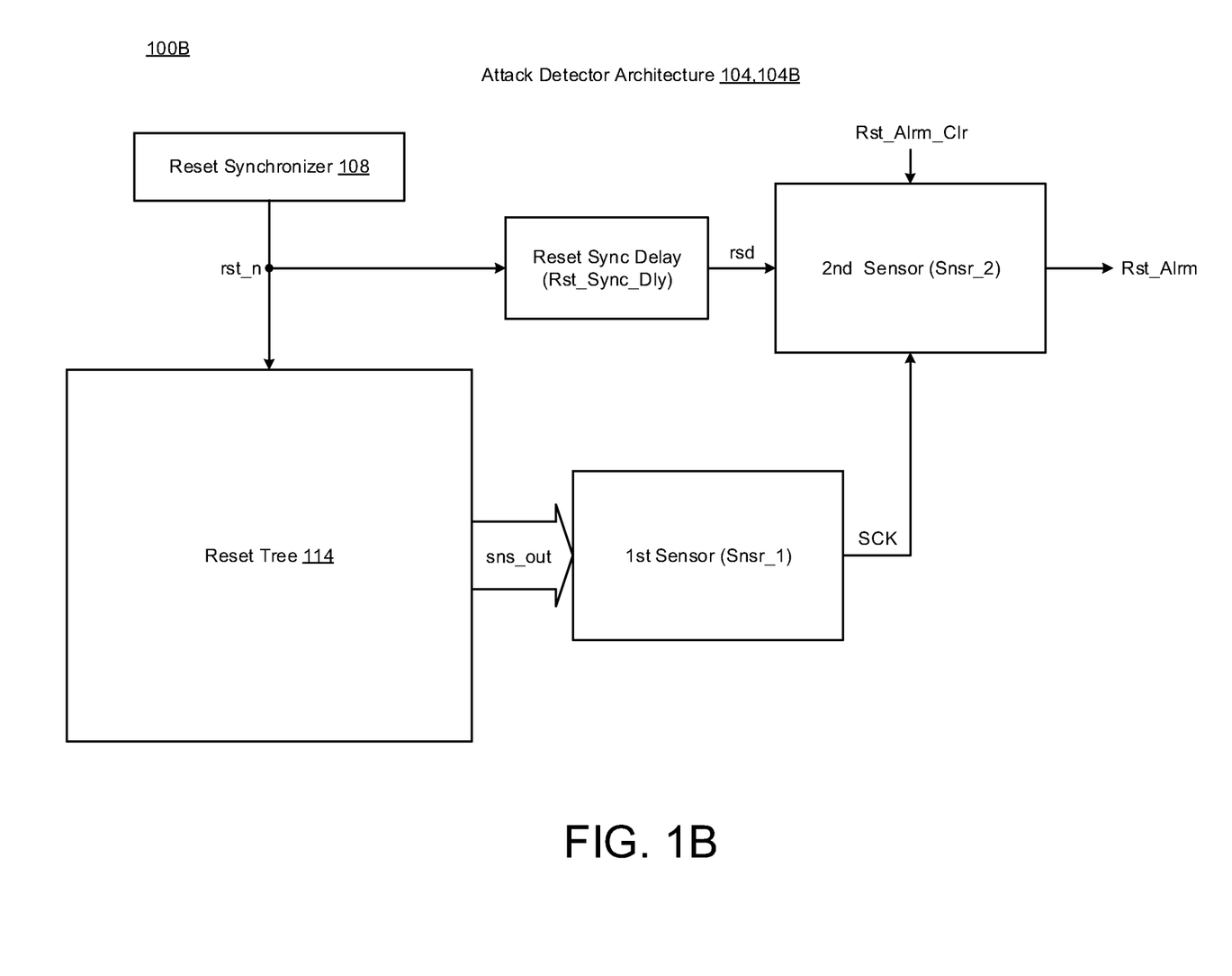

FIGS. 1A-1B illustrate diagrams of attack detector architecture 104 in accordance with various implementations described herein. In particular, FIG. 1A illustrates a diagram 100A of attack detector architecture 104A, and FIG. 1B illustrates a diagram 100B of attack detector architecture 104B. In various implementations, the attack detector architecture 104, 104A, 104B may be used for detecting malicious attacks.

In various implementations, the attack detector architecture may be implemented as a system or a device having various integrated circuit (IC) components that are arranged and coupled together as an assemblage or a combination of parts that provide for physical circuit designs and related structures. In some instances, a method of designing, providing, fabricating and manufacturing attack detector architecture as an integrated system or device may involve use of various IC circuits and components described herein so as to implement various related fabrication schemes and techniques associated therewith. Further, the attack detector architecture may be integrated with various computing circuitry and components on a single chip, and the attack detector architecture may be implemented and/or incorporated in various types of embedded systems for automotive, electronic, mobile, server and Internet-of-things (IoT) applications, including remote sensor nodes.

As shown in FIG. 1A, the attack detector architecture 104A may be implemented as a logic-based structure having a reset synchronizer 108, a reset tree 114 and one or more sensors, such as, e.g., a first sensor (Snsr_1) and a second sensor (Snsr_2). The reset synchronizer 108 may be configured to provide a reset-synchronizing signal (rst_n), and the reset tree 114 may include leaf buffers that provide sensed output signals (sns_out) based on the reset-synchronizing input signal (rst_n). The first sensor (Snsr_1) may receive the sensed output signals (sns_out) from the leaf buffers of the reset tree 114, and the first sensor (Snsr_1) may provide an attack detection signal (SCK) to the second sensor (Snsr_2) based on sensing a malicious attack. Also, the second sensor (Snsr_2) may receive the reset-synchronizing input signal (rst_n), receive the attack detection signal (SCK) from the first sensor (Snsr_1) and provide a reset alarm signal (Rst_Alrm) based on duration of a timing glitch associated with comparing a difference between the reset-synchronizing input signal (rst_n) and the attack detection signal (SCK).

In some implementations, the reset tree 114 may have multiple branches of leaf buffers and registers, and each branch of the multiple branches of leaf buffers may receive the reset-synchronizing input signal (rst_n) from external reset synchronizer logic 108 and distribute reset signals as the sensed output signals (sns_out) to corresponding registers and to corresponding inputs of the first sensor (Snsr_1). Also, the reset tree 114 may have an input buffer that inverts the reset-synchronizing input signal (rst_n) and provides an inverted reset-synchronizing input signal to each branch of leaf buffers, and then each branch of leaf buffers may receive the inverted reset-synchronizing input signal from the input buffer and then distribute the reset signals as the sensed output signals (sns_out) to the corresponding registers and to the corresponding inputs of the first sensor (Snsr_1). These features related to leaf buffers and registers will be described in greater detail herein in FIG. 2A.

In some implementations, the first sensor (Snsr_1) may have first sensor logic that senses the reset signals as the sensed output signals (sns_out) from each branch of the leaf buffers of the reset tree 114 and provides the attack detection signal (SCK) to the second sensor (Snsr_2) as a sensed clock signal based on sensing the malicious attack. Also, the first sensor logic (Snsr_1) may refer to multiple logic gates that are arranged and configured to receive the reset signals as the sensed output signals (sns_out) from the reset tree 114 corresponding to each branch of leaf buffers and provide the attack detection signal (SCK) to the second sensor (Snsr_2) as the sensed clock signal based on sensing the malicious attack. These features and various other aspects related to the first sensor (Snsr_1) will be described in greater detail herein in reference to FIG. 2A.

In some implementations, the second sensor (Snsr_2) may have second sensor logic that receives the sensed clock signal (SCK) from the first sensor (Snsr_1) and provides the reset alarm signal (Rst_Alrm) based on the duration of the timing glitch associated with comparing the timing difference between the reset-synchronizing input signal (rst_n) and the sensed clock signal (SCK). Also, the second sensor logic (Snsr_2) may have an output latch that receives the sensed clock signal (SCK) from the first sensor (Snsr_1) and then provides the reset alarm signal (Rst_Alrm) based on the duration of the timing glitch associated with comparing the timing difference between the reset-synchronizing input signal (rst_n) and the sensed clock signal (SCK). The output latch may generate the reset alarm signal (Rst_Alrm) when the duration of the timing glitch on reset assertion is longer than a predetermined pulse width of the sensed clock signal (SCK). In some instances, the second sensor logic (Snsr_2) may have an input latch that receives the reset-synchronizing input signal (rst_n) and provides a delayed reset-synchronizing input signal to the output latch. The second sensor logic (Snsr_2) may have a logic gate that receives the delayed reset-synchronizing input signal from the input latch and then provides the delayed reset-synchronizing input signal to the output latch based on a reset-alarm clear signal (Rst_Alrm_Clr). These features and other aspects related to the second sensor (Snsr_2) will be described in greater detail herein in FIGS. 2A-2B.

As shown in FIG. 1B, the attack detector architecture 104B may refer to similar attack detector architecture 104A of FIG. 1A that may be implemented with a similar logic structure having the reset synchronizer 108, the reset tree 114 and the one or more sensors, such as, e.g., a first sensor (Snsr_1) and a second sensor (Snsr_2). Also, along with a similar logic structure, the attack detector architecture 104B may have reset synchronizer delay logic (Rst_Sync_Dly) that is coupled between the reset synchronizer 108 and the second sensor (Snsr_2). In this instance, the reset synchronizer delay logic (Rst_Sync_Dly) may receive the reset-synchronizing input signal (rst_n) from external reset synchronizer logic 108, and then provide a reset-synchronizing delay signal (rsd) to the second sensor (Snsr_2). Also, in some instances, the second sensor logic (Snsr_2) may have an input latch that receives the reset-synchronizing delay signal (rsd) and provides a delayed reset-synchronizing input signal to the output latch. Further, in some instances, the second sensor logic (Snsr_2) may have a logic gate that receives the delayed reset-synchronizing input signal (rsd) from the input latch and then provides the delayed reset-synchronizing input signal to the output latch based on the reset-alarm clear signal (Rst_Alrm_Clr). These features and various other aspects related to the reset synchronizer delay logic (Rst_Sync_Dly) and the second sensor (Snsr_2) will be described in greater detail herein in reference to FIG. 2B.

Figure 2A:
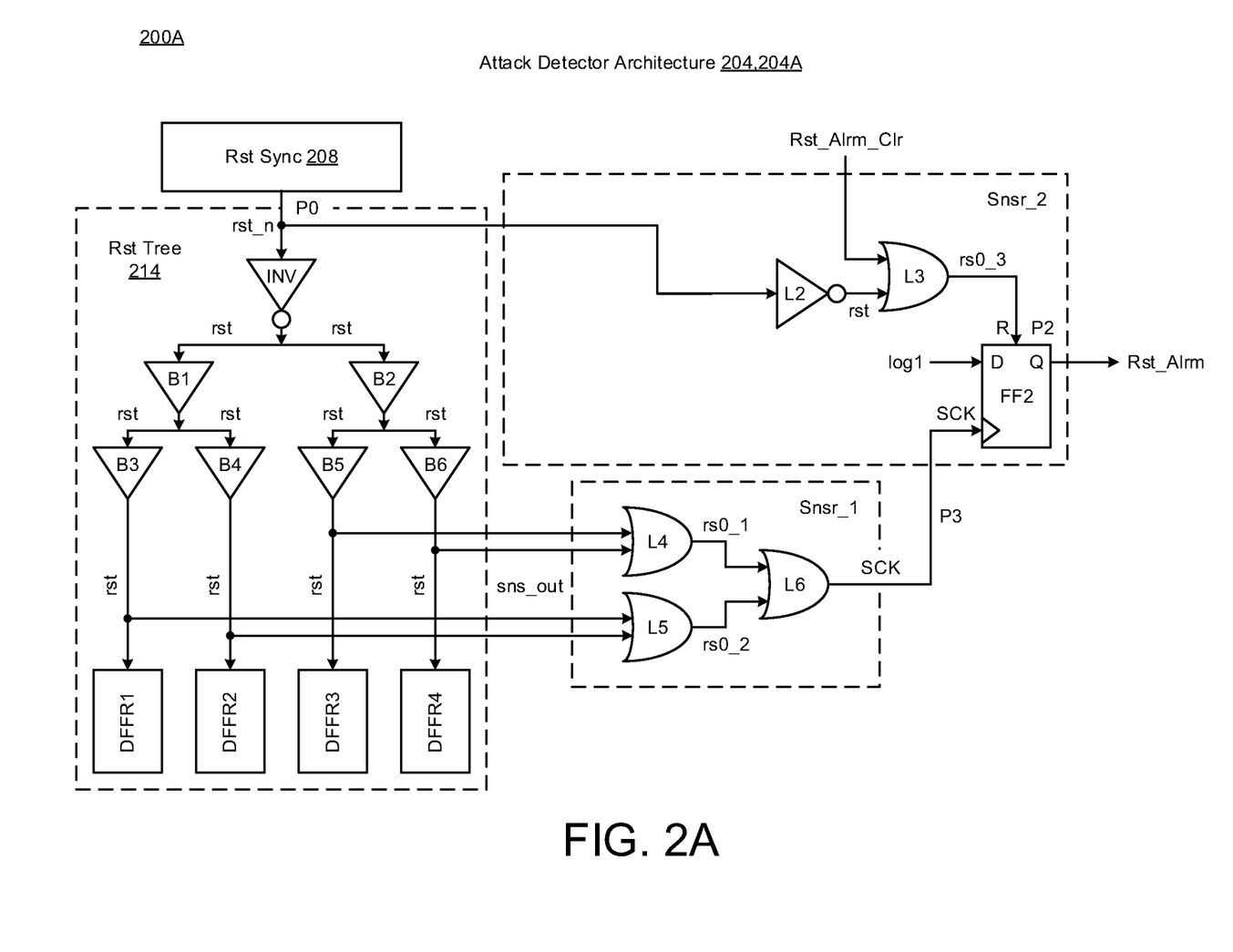
FIGS. 2A-2B illustrate diagrams of attack detector architecture in accordance with various implementations described herein.
Figure 2B:
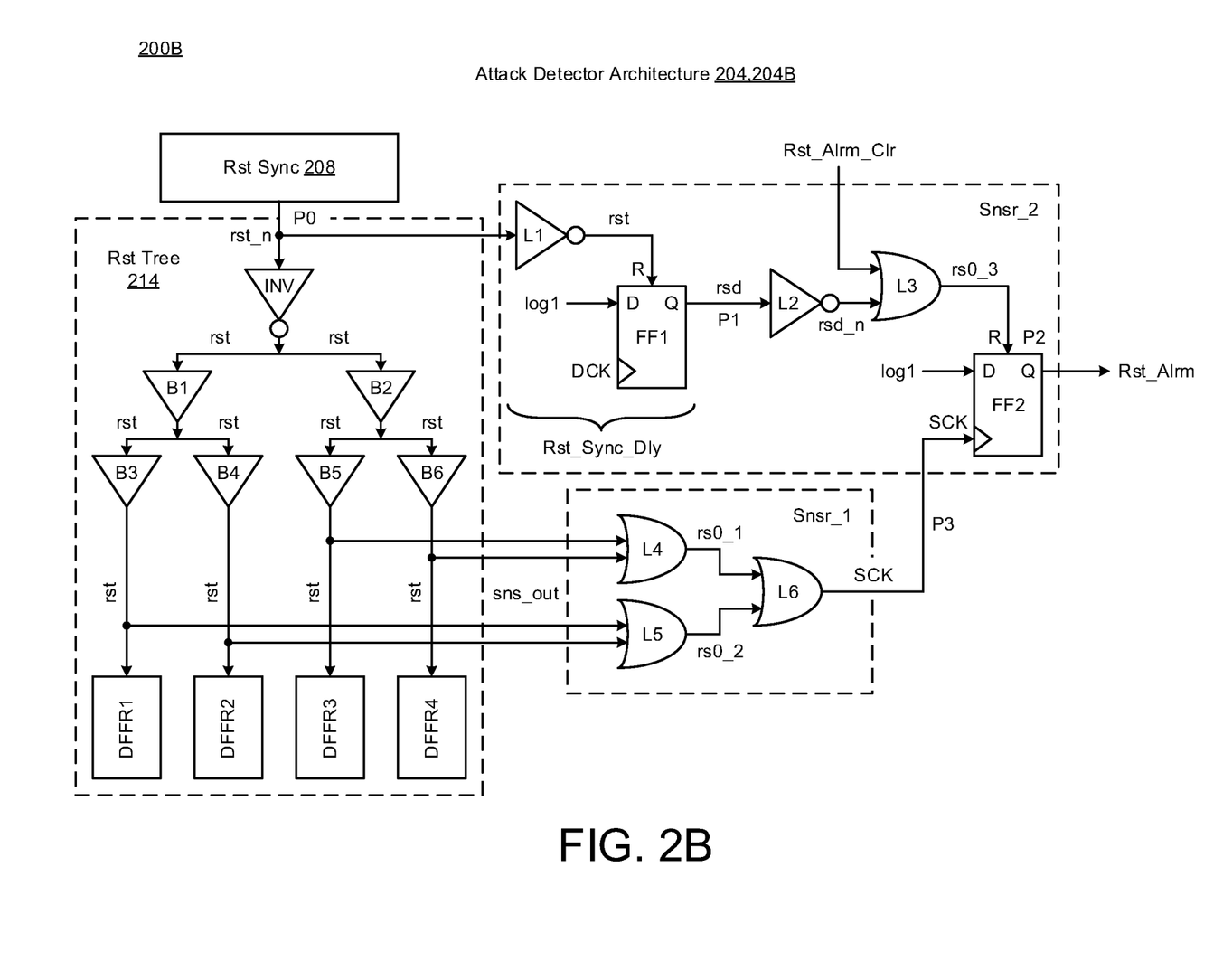

FIGS. 2A-2B illustrate diagrams of attack detector architecture 204 in accordance with various implementations described herein. In particular, FIG. 2A illustrates a diagram 200A of attack detector architecture 204A, and FIG. 2B illustrates a diagram 200B of attack detector architecture 204B. In various implementations, the attack detector architecture 204, 204A, 204B may be used for detecting malicious attacks.

In various implementations, the attack detector architecture may be implemented as a system or a device having various integrated circuit (IC) components that are arranged and coupled together as an assemblage or a combination of parts that provide for physical circuit designs and related structures. In some instances, a method of designing, providing, fabricating and manufacturing attack detector architecture as an integrated system or device may involve use of various IC circuits and components described herein so as to implement various related fabrication schemes and techniques associated therewith. Further, the attack detector architecture may be integrated with various computing circuitry and components on a single chip, and the attack detector architecture may be implemented and/or incorporated in various types of embedded systems for automotive, electronic, mobile, server and Internet-of-things (IoT) applications, including remote sensor nodes.

As shown in FIG. 2A, the attack detector architecture 204A may refer to similar attack detector architecture 104A of FIG. 1A that may be implemented with a similar logic-based structure having a reset synchronizer 208, a reset tree 214 and one or more sensors, such as, e.g., a first sensor (Snsr_1) and a second sensor (Snsr_2). The reset synchronizer 208 may be configured to provide a reset-synchronizing signal (rst_n), and the reset tree 214 may include leaf buffers (B1, B2, . . . , B6) that provide sensed output signals (rst and sns_out) based on the reset-synchronizing input signal (rst_n). The first sensor (Snsr_1) may receive the sensed output signals (rst and sns_out) from the leaf buffers (B1, B2, . . . , B6) of the reset tree 214, and the first sensor (Snsr_1) may provide an attack detection signal (SCK) to the second sensor (Snsr_2) based on sensing a malicious attack. The second sensor (Snsr_2) may receive the reset-synchronizing input signal (rst_n), receive the attack detection signal (SCK) from the first sensor (Snsr_1) and provide a reset alarm signal (Rst_Alrm) based on the duration of the timing glitch associated with comparing a difference between the reset-synchronizing input signal (rst_n) and the attack detection signal (SCK).

In some implementations, the reset tree 214 may have multiple branches of leaf buffers (B1/B3/B4 and B2/65/66) and registers (DFFR1, DFFR2, DFFR3, DFFR4), and each branch of the multiple branches of the leaf buffers (B1/B3/B4 and B2/65/66) may receive the reset-synchronizing input signal (rst_n) from the external reset synchronizer logic 208 and distribute reset signals as sensed output signals (rst and sns_out) to corresponding registers (DFFR1, . . . , DFFR4) and corresponding inputs of the first sensor (Snsr_1). The reset tree 214 may have an input buffer (INV) that inverts the reset-synchronizing input signal (rst_n) and provides an inverted reset-synchronizing input signal (rst) to each branch of leaf buffers (B1/B3/B4 and B2/65/66), and then each branch of leaf buffers (B1/B3/B4 and B2/65/66) may receive the inverted reset-synchronizing input signal (rst) from the input buffer (INV) and distribute the reset signals (rst) as the sensed output signals (sns_out) to the corresponding registers and to the corresponding inputs of the first sensor (Snsr_1).

In some implementations, the first sensor (Snsr_1) may have first sensor logic (L4, L5, L6) that senses the reset signals (rst) as the sensed output signals (sns_out) from each branch of the leaf buffers (B1/B3/B4 and B2/65/66) of the reset tree 214 and provides the attack detection signal (SCK) to the second sensor (Snsr_2) as a sensed clock signal based on sensing the malicious attack. Also, in some instances, the first sensor logic (Snsr_1) may refer to multiple logic gates (L4, L5, L6) that are arranged and configured to receive the reset signals (rst) as the sensed output signals (sns_out) from the reset tree 214 corresponding to each branch of leaf buffers (B1/B3/B4 and B2/65/66) and then provide the attack detection signal (SCK) to the second sensor (Snsr_2) as the sensed clock signal based on sensing the malicious attack. Also, in some instances, the first sensor logic (L4, L5, L6) may have logic gates (L4, L5) that receives the reset signals (rst) and provides reset output signals (rso_1, rso_2) to logic gate (L6), which receives the rso_1/rso_2 signals and then provides the attack detection signal (SCK) to the second sensor (Snsr_2) as the sensed clock signal.

In some implementations, the second sensor (Snsr_2) may include second sensor logic (L2, L3, FF2) that receives the reset-synchronizing signal (rst_n), receives the sensed clock signal (SCK), and provides the reset alarm signal (Rst_Alrm) based on the duration of the timing glitch associated with comparing the difference between the reset-synchronizing input signal (rst_n) and the sensed clock signal (SCK). Also, in some instances, the second sensor logic (Snsr_2) may have an output latch (FF2) that receives the sensed clock signal (SCK) from the first sensor (Snsr_1) and provides the reset alarm signal (Rst_Alrm) based on duration of the timing glitch associated with comparing the timing difference between the reset-synchronizing input signal (rst_n) and the sensed clock signal (SCK). The output latch (FF2) may generate the reset alarm signal (Rst_Alrm) when the duration of the glitch on reset clear is longer than a predetermined pulse width of the sensed clock signal (SCK). Also, as shown in FIG. 2B, the second sensor logic (Snsr_2) may have an input latch (FF1) that receives reset-synchronizing input signal (rst_n) and provides a delayed reset-synchronizing input signal (rsd) to the output latch (FF2). The second sensor logic (Snsr_2) may include a logic gate (L3) that receives the delayed reset-synchronizing input signal from the input latch (FF1) and then provides the delayed reset-synchronizing input signal (rsd) to the output latch (FF2) based on the reset-alarm clear signal (Rst_Alrm_Clr).

In some implementations, as shown in FIG. 2A, the second sensor (Snsr_2) may include an inverter (L2) that receives the reset-synchronizing input signal (rst_n) and provide an inverted signal (rst) to logic gate (L3). Also, in some instances, the logic gate (L3) may receive the reset-alarm clear signal (Rst_Alrm_Clr), receive the inverted signal (rst), and provide a reset output signal (rso_3) to a reset port (R) of the output latch (FF2). Also, the output latch (FF2) may receive a logic one (log 1) at data port (D), receive the reset output signal (rso_3) at reset port (R), receive the attack detection signal (SCK) at a clock port, and then provide the reset alarm signal (Rst_Alrm) from a Q-output port.

As shown in FIG. 2B, the attack detector architecture 204B may refer to similar attack detector architecture 204A of FIG. 2A that may be implemented with a similar logic structure having the reset synchronizer 208, the reset tree 214 and the one or more sensors, such as, e.g., first sensing logic (Snsr_1) and second sensing logic (Snsr_2). Along with the similar logic structure, the attack detector architecture 204B may include reset synchronizer delay logic (Rst_Sync_Dly) that is coupled between the reset synchronizer 208 and second sensing logic (Snsr_2).

In this instance, the reset synchronizer delay logic (Rst_Sync_Dly) may have an input inverter (L1) that receives the reset-synchronizing input signal (rst_n) from the external reset synchronizer logic 208, and provides the inverted signal (rst) to the reset port (R) of the input latch (FF1). Also, the input latch (FF1) may receive a logic one (log 1) at data port (D), receive the reset signal (rst) at reset port (R), receive a clock signal (DCK) at a clock port, and then provide the delayed reset-synchronizing delay signal (rsd) from a Q-output port. Also, as shown in FIG. 2B, the second sensor (Snsr_2) may have the inverter (L2) that receives the delayed reset-synchronizing input signal (rsd) and provides an inverted signal (rsd_n) to logic gate (L3). Further, in some instances, logic gate (L3) receives the reset-alarm clear signal (Rst_Alrm_Clr), receives inverted signal (rsd_n), and provides the reset output signal (rso_3) to the reset port (R) of the output latch (FF2). Also, the output latch (FF2) may receive the logic one (log 1) at data port (D), receive the reset output signal (rso_3) at reset port (R), receive the attack detection signal (SCK) at the clock port, and then provide the reset alarm signal (Rst_Alrm) from a Q-output port.

In some implementations, the attack detection schemes and techniques described herein use a few extra logic gates (e.g., OR gates) and a register to detect a malicious attack such that the impact on power, performance and area (PPA) is low. For instance, assuming that the leaf buffers drive 32 registers each (normal constraints), and assuming that 4-input OR gates are used, the attack detection architecture may need approximately n/96 OR gates to build a reset tree, wherein n is the number of registers in the physical circuit design. These n/96 OR gates and the registers are static, wherein power leakage may only happen when the attack detection architecture is operating in functional mode.

In some implementations, the attack detection schemes and techniques described herein use the logic gate tree to sum reset alarms as location aware, so nearby alarms are grouped to a single branch, thus minimizing wire length and buffering. Since OR tree circuitry is added in implementations on the fly, the branches of OR tree may be configured to adapt placement map changes in real time. In some instances, set/reset registers may be grouped separately based on their placement to minimize the number of inverters. Also, in reference to FIGS. 1B and 2B, the extra reset synchronizer (i.e., Rst_Sync_Dly) is added to prevent unstable conditions caused by quick transitions on the input reset, which may create short clock pulses at FF2/CK. This may be needed only if the design does not already have a 2-stage reset synchronizer. An alarm may be generated as long as the duration of the glitch on reset is longer than the minimum clock pulse width of the register.

In some implementations, in reference to timing checks, a data-data setup check may be created to ensure that no false alarms are generated during reset assertion, wherein reset de-assertion may be safe from false alarms as it creates a negative edge on the clock input of flip-flop (FF2). Also, to prevent false alarm during reset assertion, FF2/R should arrive (assert reset) before earliest of FF2/CK, and the delay (P0→P2)<Delay (P0→P3) as shown in FIGS. 2A-2B. For instance, the following sequence may be used:

set_data_check-rise_from FF2/CK-rise_to FF2/R-setup <margin>

Figure 3:
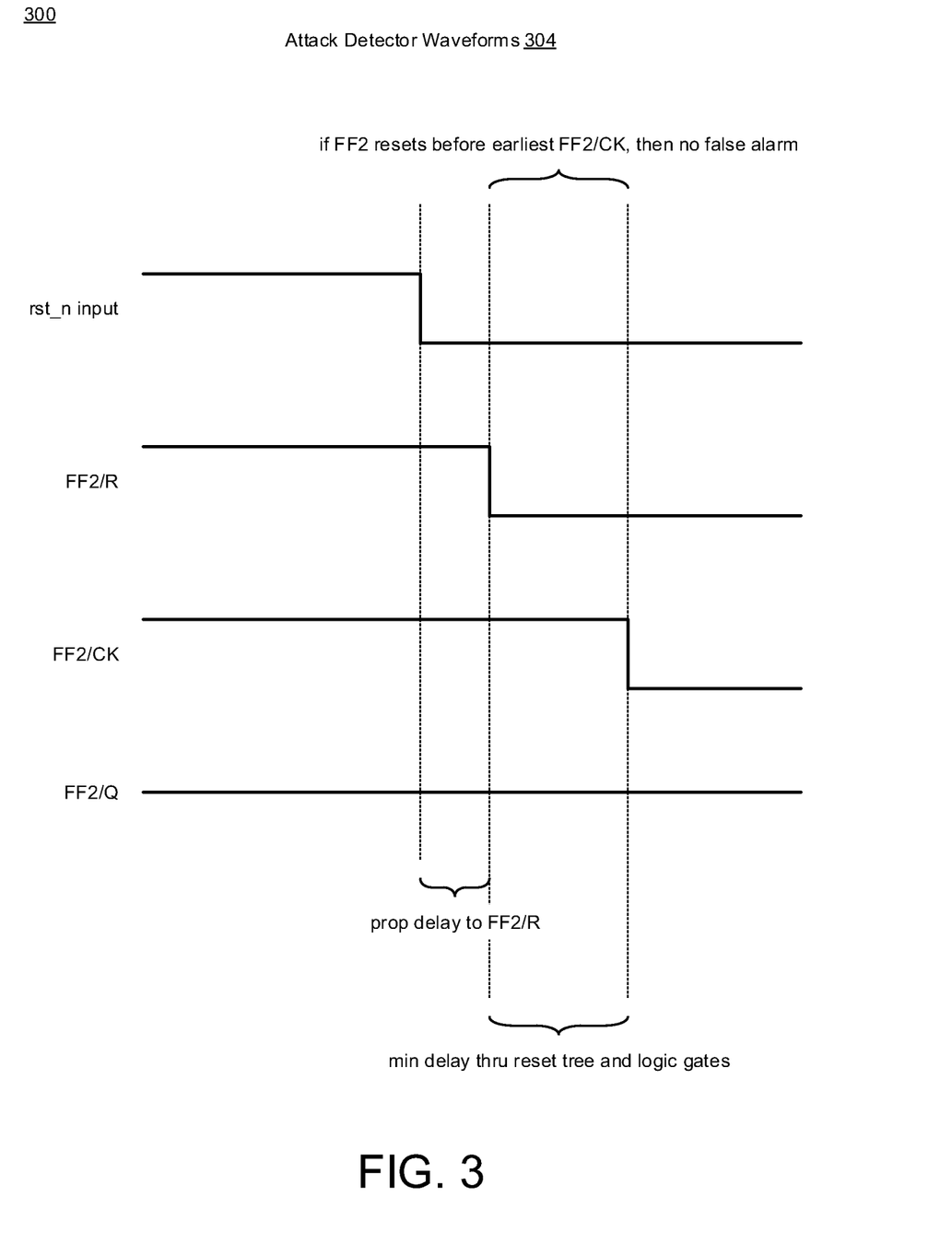
FIG. 3 illustrates a graph diagram of attack detector waveforms in accordance with various implementations described herein.

FIG. 3 illustrates a diagram 300 of attack detector waveforms 304 in accordance with various implementations described herein.

As shown in FIG. 3, the attack detector waveforms 304 show waveforms that are associated with reset assertion in reference to FIGS. 1A-1B and 2A-2B. Also, for reset de-assertion, a negative edge is seen on FF2/CK, so that no false alarms are generated.

In some implementations, as shown in FIG. 3, a negative edge of the rst_n input signal initiates a propagation delay to FF2/R, and a negative edge of the FF2/R signal ends the propagation delay to FF2/R. Also, as shown in FIG. 3, a negative edge of the FF2/R signal initiates the minimum delay thru the reset tree and logic gates, and a negative edge of the FF2/CK signal ends the minimum delay thru the reset tree and logic gates. Also, in some instances, if FF2 resets before the earliest FF2/CK, then there is no false alarm. Further, in some instances, the FF2/Q signal may remain level during the negative edge triggering of the rst_n input signal, the FF2/R signal and/or the FF2/CK signal.

Figure 4:
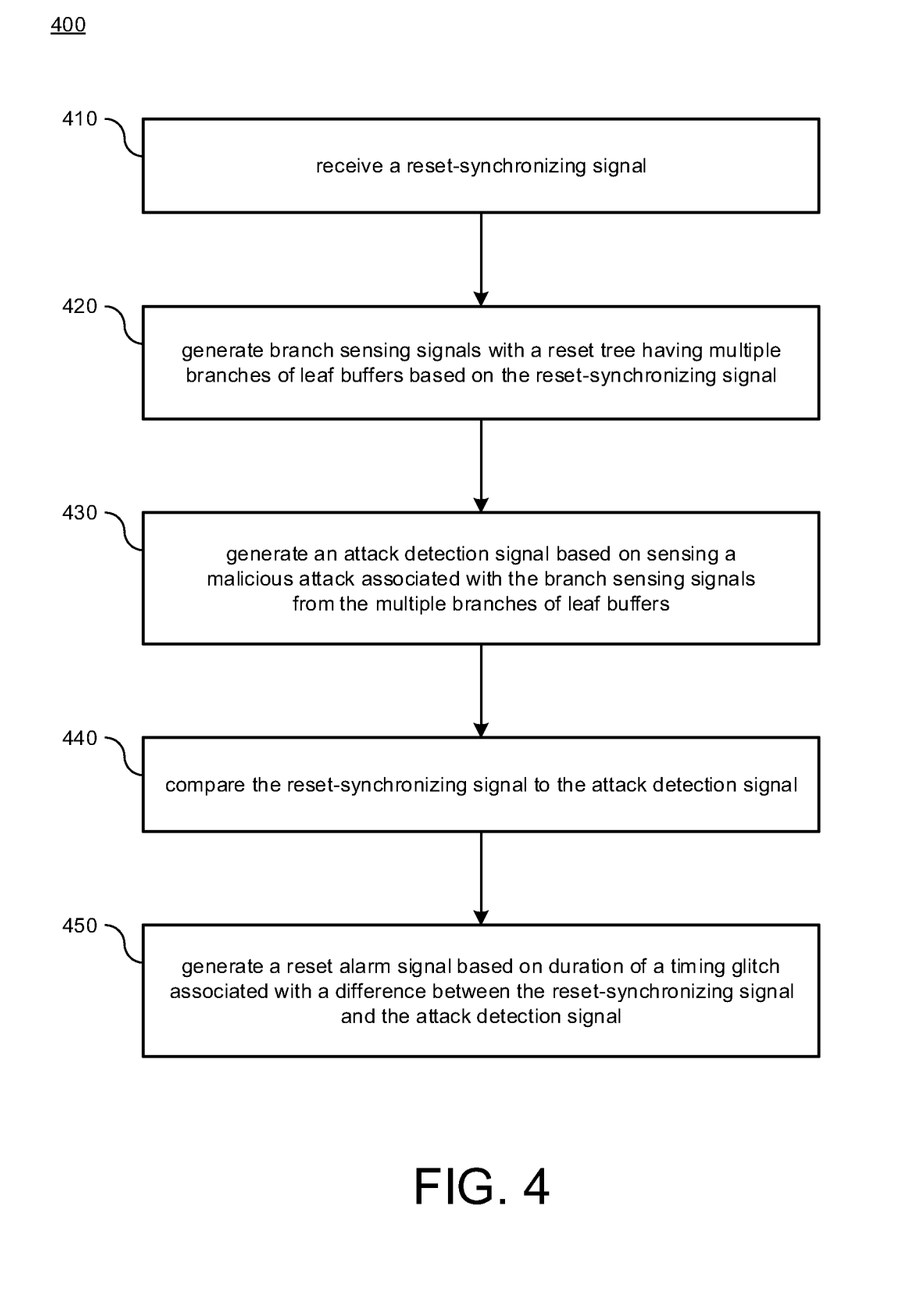
FIG. 4 illustrates a diagram of a method for providing attack detector architecture in accordance with various implementations described herein.

FIG. 4 illustrates a process diagram of a method 400 for providing attack detector architecture in accordance with various implementations described herein. Also, in various instances, method 400 may be used for detecting malicious attacks.

It should be understood that even though method 400 indicates a particular order of operation execution, in some cases, various portions of operations may be executed in a different order, and on different systems. In other cases, additional operations and/or steps may be added to and/or omitted from method 400. Also, method 400 may be implemented in hardware. For instance, if implemented in hardware, method 400 may be implemented with various components and/or circuitry, as described herein above in FIGS. 1A-3.

As described in reference to FIG. 4, the method 400 may be used for fabricating and/or manufacturing, or causing to be fabricated and/or manufactured, an integrated circuit (IC) that implements various schemes and techniques in physical design as described herein so as to thereby provide for attack detector architecture using various devices, components and/or circuitry as described herein.

At block 410, method 400 may receive a reset-synchronizing signal. At block 420, method 400 may generate branch sensing signals with a reset tree having multiple branches of leaf buffers based on the reset-synchronizing signal. Also, at block 430, method 400 may generate an attack detection signal based on sensing a malicious attack associated with the branch sensing signals from the multiple branches of leaf buffers. At block 440, method 400 may compare the reset-synchronizing signal to the attack detection signal. At block 450, method 400 may generate a reset alarm signal based on duration of a timing glitch associated with a difference between the reset-synchronizing signal and the attack detection signal.

In some implementations, the leaf buffers of the reset tree may provide the branch sensing signals based on the reset-synchronizing signal. Also, the attack detection signal is generated by first sensing logic that receives the branch sensing signals from the leaf buffers of the reset tree and then provides the attack detection signal based on sensing the malicious attack. Also, the reset alarm signal may be generated by second sensing logic that receives the reset-synchronizing signal, receives the attack detection signal from the first sensing logic and then provides the reset alarm signal based on the duration of the timing glitch.

In some implementations, the first sensing logic may provide the attack detection signal to the second sensing logic as a sensed clock signal based on sensing the malicious attack. In addition, the second sensing logic may receive the sensed clock signal from the first sensing logic and then provide the reset alarm signal based on the duration of the timing glitch associated with comparing the difference between the delayed reset-synchronizing signal and the sensed clock signal.

It should be intended that the subject matter of the claims not be limited to various implementations and/or illustrations provided herein, but should include any modified forms of those implementations including portions of implementations and combinations of various elements in reference to different implementations in accordance with the claims. It should also be appreciated that in development of any such implementation, as in any engineering or design project, numerous implementation-specific decisions should be made to achieve developers' specific goals, such as, e.g., compliance with system-related constraints and/or business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Described herein are various implementations of a device having a reset tree having leaf buffers that provide sensed output signals based on a reset-synchronizing input signal. The device may have a first sensor that receives the sensed output signals from the leaf buffers of the reset tree and provides an attack detection signal based on sensing a malicious attack. The device may have a second sensor that receives the reset-synchronizing input signal, receives the attack detection signal from the first sensor and provides a reset alarm signal based on duration of a timing glitch associated with comparing a difference between the reset-synchronizing input signal and the attack detection signal.

Described herein are various implementations of a device having reset delaying logic that receives a reset-synchronizing signal and provides a delayed reset-synchronizing signal. The device may have first sensing logic that receives branch sensing signals from a reset tree and generates an attack detection signal based on sensing a malicious attack. The device may have second sensing logic that receives the delayed reset-synchronizing signal, receives the attack detection signal and provides a reset alarm signal based on duration of a timing glitch associated with a difference between the delayed reset-synchronizing input signal and the attack detection signal.

Described herein are various implementations of a method. The method may receive a reset-synchronizing signal, and the method may generate branch sensing signals with a reset tree having multiple branches of leaf buffers based on the reset-synchronizing signal. The method may generate an attack detection signal based on sensing a malicious attack associated with the branch sensing signals from the multiple branches of leaf buffers, and the method may compare the reset-synchronizing signal to the attack detection signal. The method may generate a reset alarm signal based on duration of a timing glitch associated with a difference between the reset-synchronizing signal and the attack detection signal.

Reference has been made in detail to various implementations, examples of which are illustrated in accompanying drawings and figures. In the following detailed description, numerous specific details are set forth to provide a thorough understanding of the disclosure provided herein. However, the disclosure provided herein may be practiced without these specific details. In various implementations, well-known methods, procedures, components, circuits and networks have not been described in detail so as not to unnecessarily obscure details of the embodiments.

It should also be understood that, although various terms first, second, etc. may be used herein to describe various elements, these elements should not be limited by these terms. These terms are only used to distinguish one element from another. For instance, a first element could be termed a second element, and, similarly, a second element could be termed a first element. Also, the first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and various other similar terms that indicate relative positions above or below a given point or element may be used in connection with various implementations of various technologies described herein.

While the foregoing is directed to implementations of various techniques described herein, other and further implementations may be devised in accordance with the disclosure herein, which may be determined by the claims that follow. Although the subject matter has been described in language specific to structural features and/or methodological acts, it is to be understood that the subject matter defined in the appended claims is not necessarily limited to the specific features or acts described above. Rather, specific features and/or acts described above are disclosed as example forms of implementing the claims.

What is claimed is:

1. A device comprising:
    a reset tree having leaf buffers that provide sensed output signals based on a reset-synchronizing input signal;
    a first sensor that receives the sensed output signals from the leaf buffers of the reset tree and provides an attack detection signal based on sensing a malicious attack; and
    a second sensor that receives the reset-synchronizing input signal, receives the attack detection signal from the first sensor and provides a reset alarm signal based on duration of a timing glitch associated with comparing a difference between the reset-synchronizing input signal and the attack detection signal.

2. The device of claim 1, wherein:
    the reset tree has multiple branches of the leaf buffers and registers, and
    each branch of the multiple branches of the leaf buffers receives the reset-synchronizing input signal from external reset synchronizer logic and distributes reset signals as the sensed output signals to corresponding registers and to corresponding inputs of the first sensor.

3. The device of claim 2, wherein:
    the reset tree has an input buffer that inverts the reset-synchronizing input signal and provides an inverted reset-synchronizing input signal to each branch of the leaf buffers, and
    each branch of the leaf buffers receives the inverted reset-synchronizing input signal from the input buffer and then distributes the reset signals as the sensed output signals to the corresponding registers and to the corresponding inputs of the first sensor.

4. The device of claim 2, wherein:
    the first sensor has first sensor logic that senses the reset signals from each branch of the leaf buffers of the reset tree and provides the attack detection signal to the second sensor as a sensed clock signal based on sensing the malicious attack.

5. The device of claim 4, wherein:
    the first sensor logic refers to multiple logic gates that are arranged and configured to receive the reset signals from the reset tree corresponding to each branch of the leaf buffers and then provide the attack detection signal to the second sensor as the sensed clock signal based on sensing the malicious attack.

6. The device of claim 4, wherein:
    the second sensor has second sensor logic that receives the sensed clock signal from the first sensor and provides the reset alarm signal based on the duration of the timing glitch associated with comparing the difference between the reset-synchronizing input signal and the sensed clock signal.

7. The device of claim 6, wherein:
    the second sensor logic has an output latch that receives the sensed clock signal from the first sensor and provides the reset alarm signal based on the duration of the timing glitch associated with comparing the difference between the reset-synchronizing input signal and the sensed clock signal.

8. The device of claim 7, wherein:
    the output latch generates the reset alarm signal when the duration of the timing glitch on reset assertion is longer than a predetermined pulse width of the sensed clock signal.

9. The device of claim 7, wherein:
    the second sensor logic has an input latch that receives the reset-synchronizing input signal and provides a delayed reset-synchronizing input signal to the output latch.

10. The device of claim 9, wherein:
    the second sensor logic has a logic gate that receives the delayed reset-synchronizing input signal from the input latch and provides the delayed reset-synchronizing input signal to the output latch based on a reset-alarm assertion signal.

11. A device comprising:
reset delaying logic that receives a reset-synchronizing signal and provides a delayed reset-synchronizing signal;
first sensing logic that receives branch sensing signals from a reset tree and generates an attack detection signal based on sensing a malicious attack; and
second sensing logic that receives the delayed reset-synchronizing signal, receives the attack detection signal and provides a reset alarm signal based on duration of a timing glitch associated with a difference between the delayed reset-synchronizing input signal and the attack detection signal.

12. The device of claim 11, further comprising:
a reset tree having the leaf buffers that provide the branch sensing signals based on the reset-synchronizing signal.

13. The device of claim 12, wherein:
the first sensing logic receives the branch sensing signals from the leaf buffers of the reset tree and provides the attack detection signal based on sensing the malicious attack.

14. The device of claim 13, wherein:
the second sensing logic receives the delayed reset-synchronizing signal from the reset delaying logic, receives the attack detection signal from the first sensing logic and provides the reset alarm signal based on the duration of the timing glitch.

15. The device of claim 14, wherein:
the first sensing logic provides the attack detection signal to the second sensing logic as a sensed clock signal based on sensing the malicious attack, and
the second sensing logic receives the sensed clock signal from the first sensing logic and provides the reset alarm signal based on the duration of the timing glitch associated with comparing the difference between the delayed reset-synchronizing signal and the sensed clock signal.

16. A method comprising:
receiving a reset-synchronizing signal;
generating branch sensing signals with a reset tree having multiple branches of the leaf buffers based on the reset-synchronizing signal;
generating an attack detection signal based on sensing a malicious attack associated with the branch sensing signals from the multiple branches of the leaf buffers;
comparing the reset-synchronizing signal to the attack detection signal; and
generating a reset alarm signal based on duration of a timing glitch associated with a difference between the reset-synchronizing signal and the attack detection signal.

17. The method of claim 16, wherein:
the leaf buffers of the reset tree provide the branch sensing signals based on the reset-synchronizing signal.

18. The method of claim 17, wherein:
the attack detection signal is generated by first sensing logic that receives the branch sensing signals from the leaf buffers of the reset tree and then provides the attack detection signal based on sensing the malicious attack.

19. The method of claim 18, wherein:
the reset alarm signal is generated by second sensing logic that receives the reset-synchronizing signal, receives the attack detection signal from the first sensing logic and then provides the reset alarm signal based on the duration of the timing glitch.

20. The method of claim 19, wherein:
the first sensing logic provides the attack detection signal to the second sensing logic as a sensed clock signal based on sensing the malicious attack, and
the second sensing logic receives the sensed clock signal from the first sensing logic and provides the reset alarm signal based on the duration of the timing glitch associated with comparing the difference between the delayed reset-synchronizing signal and the sensed clock signal.

* * * * *